March 14, 1933.  H. W. KRANZ ET AL  1,901,457
APPARATUS FOR MAKING WIRE WHEELS
Filed March 18, 1931   2 Sheets-Sheet 1

INVENTORS
Harry W. Kranz,
Charles S. Holden &
Harold R. Uber
BY Fay, Oberlin & Fay
ATTORNEYS.

March 14, 1933.  H. W. KRANZ ET AL  1,901,457
APPARATUS FOR MAKING WIRE WHEELS
Filed March 18, 1931  2 Sheets-Sheet 2

INVENTORS
Harry W. Kranz,
BY Charles S. Holden &
Harold R. Uber
Fay, Oberlin & Fay
ATTORNEYS.

Patented Mar. 14, 1933

1,901,457

UNITED STATES PATENT OFFICE

HARRY W. KRANZ, CHARLES S. HOLDEN, AND HAROLD R. UBER, OF LAKEWOOD, OHIO, ASSIGNORS TO THE CLEVELAND WELDING COMPANY, OF CLEVELAND, OHIO, A CORPORATION OF OHIO

APPARATUS FOR MAKING WIRE WHEELS

Application filed March 18, 1931. Serial No. 523,490.

The present invention, relating as indicated to an apparatus for making wire wheels, pertains more particularly to an improved construction of a mechanism for accomplishing the method of connecting wire spokes to the corresponding wheel parts. The particular process referred to constitutes the subject matter of our co-pending application, Serial No. 404,684, filed November 4, 1929.

The general object and nature of our invention is to provide an apparatus which will efficiently and rapidly accomplish the assembly of wire wheels having an initial tension in their spokes produced by the action of hot riveting the spoke ends to the wheel rim or hub. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
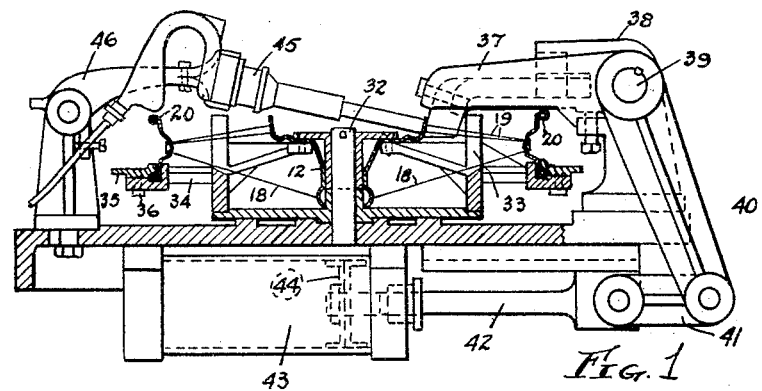
Figure 2:
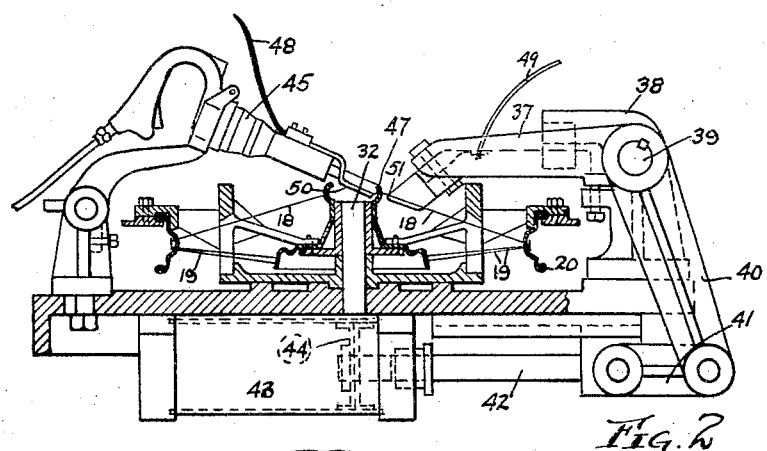
Figure 3:
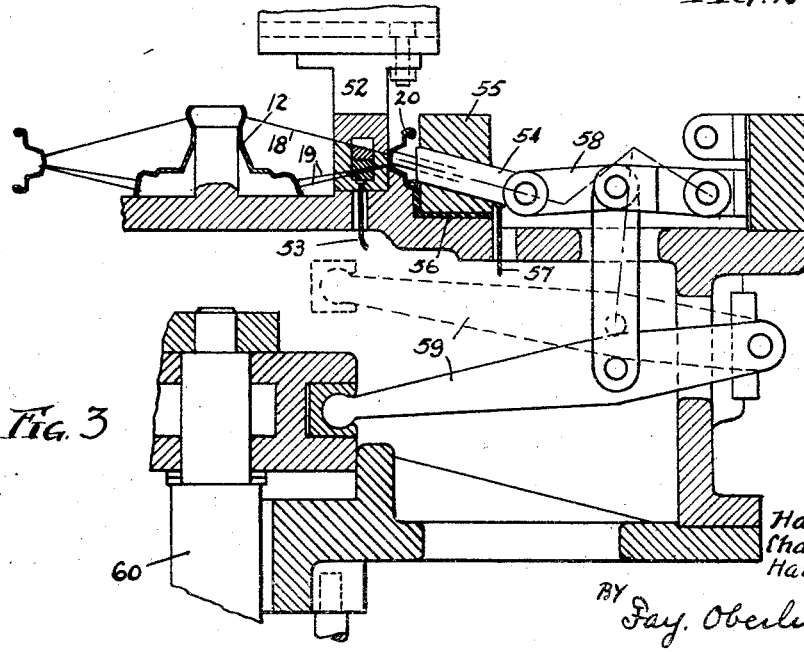
Figure 4:
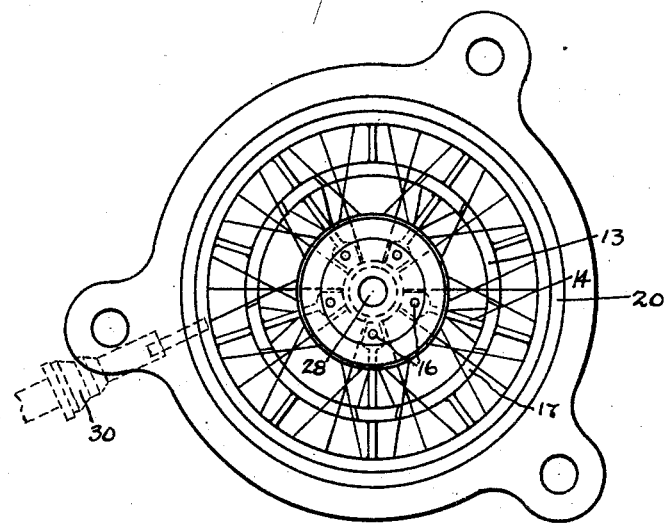
Figure 5:
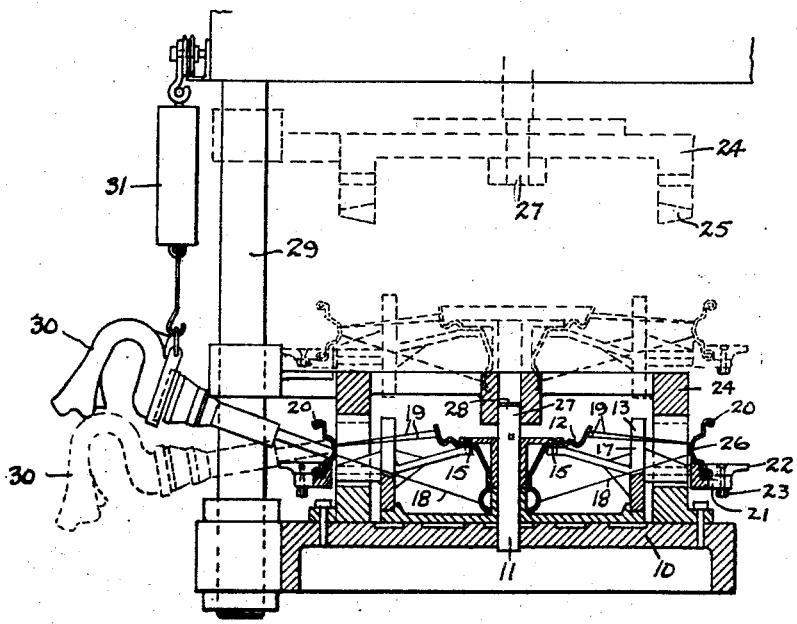

In said annexed drawings:

Fig. 1 is a vertical section view of an apparatus embodying the spoke-gripping arms and upsetting hammer for riveting the inner ends of the spokes to the corresponding wheel part; Fig. 2 is a vertical section view of an apparatus similar to that in Fig. 1, but showing the use of electric heating means for heating the spoke ends incidentally to such riveting operation; Fig. 3 is a vertical section view of an apparatus for electrically heating and upsetting the outer ends of the spokes; Fig. 4 is a plan view of an apparatus for riveting the outer ends of the spokes to the corresponding wheel part; Fig. 5 is a front section view of the apparatus shown in Fig. 4.

Referring especially to Fig. 5, the base plate 10 has projecting upwardly therefrom the spindle 11, upon which is mounted the hub element 12 of the wheel. The spider 13, coaxially mounted with the spindle 11, has inwardly projecting arms 14 which engage the hub element 12 by means of pins 15 extending through holes 16 in the hub element. Said spider member 13 has formed therein apertures 17 to permit the spokes 18 and 19 to extend from the hub element 12 to the rim 20. Said spider member 13 has extending outwardly therefrom arms 21 which have removably attached thereto clamps 22 by means of bolt 23 for holding said rim element 20 in proper relation with the hub element 12. Complementary spoke and rim securing element 24 has its ends 25 so formed as to extend downwardly and engage spoke elements 18 and 19 as well as the inner surface 26 of rim element 20 during the riveting process. Said complementary element 24 has formed therein a spindle receiving aperture 27 which engages the end 28 of the spindle 11 when such complementary element 24 is in operating position. The spoke and rim securing element 24 is mounted on securing arm 29 and is adapted to be axially displaced along said arm to the position shown by the dotted lines in Fig. 5, and when in such dotted line position the completed wheel, after the completion of the riveting process, may be readily removed from its seat on the spindle and spider elements. An air hammer 30, or other suitable reciprocating impact means is supported by the flexible member 31 so that such hammer or means 30 may be brought to the proper riveting position against the outer surface of the wheel.

In Fig. 1 is shown an apparatus especially adapted to receive the inner ends of the spoke elements 19 at their juncture with the hub element 12. In this apparatus the hub element 12 is rotatably mounted on the spindle 32. The spider 33 is coaxially mounted with said spindle 32 and has projecting therefrom arms 34 which carry rim securing clamps 35 and bolts 36 for securing the rim 20 in its proper relation to the hub element 12. Spoke gripping arms 37 are mounted on support 38 and keyed to shaft 39, shaft 39 being adapted to rotate in supporting member 38. Gripping arms 37 have integrally formed therewith a downwardly extending arm 40, which is in turn coupled by means of link 41 and rod 42 to air cylinder 43. Said spoke gripping members 37 are so formed that when air or other suitable pressure means is introduced against the left face of piston 44 said gripping arms 37 securely hold spoke members 19 in the position shown in Fig. 1 while the riveting process is carried on. An air hammer 45 or other suitable reciprocating impact means is mounted upon, and held in position, by supporting arm 46.

In Fig. 2 is shown an apparatus for riveting the inner ends of the spokes 18 to the inner end 47 of hub element 12 of the wheel. Spoke gripping arms 37 are employed and are equipped in like manner as described in Fig. 1. Suitable riveting means, such as air hammers 45, are also employed in this apparatus as hereinbefore described. Electric leads 48 and 49 are connected to contact elements 50 and spoke gripping elements 37 respectively. When the spoke gripping elements and the riveting means are in operating position as shown in Fig. 2, an electric current is permitted to flow from one electric lead to another through the spoke end 51, heating and softening said spoke end 51 to facilitate the riveting process. A further purpose of heating this spoke is to cause such spoke, after it has been properly riveted and subsequently cooled, to have contained therein a desirable amount of initial tension.

It can readily be seen from a careful examination of Figs. 1 and 2 that the processes described in connection with each figure may be employed alternatively in either arrangement, so that the spoke may be riveted hot at either its inner or outer end.

In Fig. 3 the hub element 12 is again mounted in suitable retaining means, the spokes in this arrangement, however, having first been riveted at their inner ends to the hub element, the outer ends of the spokes 18 and 19 extending through openings formed in rim 20. Said rim 20 is backed up and held in position by spoke and rim retaining member 52. Said spoke and rim retaining member 52, which serves the double purpose of securing the rim in position and at the same time gripping the spokes 18 and 19 adjacent to said rim, has connected therewith electric leads 53. The thrust bar 54, which in this particular form of apparatus operates as an upsetting element by pressing against the projecting ends of the spokes adjacent to the outer surface of the rim, is movably retained in guiding block 55. Said guiding block 55 is insulated from the other parts of the mechanism by insulating material 56. Said thrust bar 54 has connected thereto electric lead 57, which lead 57, in conjunction with lead 53, causes an electric current to flow through the spoke ends which such thrust bar 54 is brought into contact with said spoke end. Thrust bar 54 is actuated in guiding block 55 and forced against the spoke ends by means of toggle elements 58, said toggle elements 58 being in turn actuated by cross-bar 59 and reciprocating element 60, which is preferably the end of a piston operated by air or hydraulic means.

It will be seen from an examination of the foregoing apparatus that a spoke may be inserted in the wheel, its end being suitably heated before riveting. The purpose of heating the spokes as hereinbefore explained is to facilitate the riveting process and, in addition, when such riveting process is completed and the spoke permitted to cool, such spoke will have the desired amount of initial tension necessary to sound wire wheel construction.

Other modes of applying the principle of our invention may be employed instead of the one explained, change being made as regards the means and the steps herein disclosed, provided those stated by any of the following claims or their equivalent be employed.

We therefore particularly point out and distinctly claim as our invention:

1. In a wheel making apparatus, the combination of a spindle for securing the hub of the wheel, with a spider mounted coaxially therewith and adapted to secure the rim of said wheel, complementary spoke and rim securing means movable axially of said spindle, and means for upsetting the ends of said spokes.

2. In a wheel making apparatus, the combination of a spindle for securing the hub of the wheel, with a spider mounted coaxially therewith and adapted to secure in proper relation the rim and hub of said wheel, complementary spoke and rim securing flanges adapted to be axially displaced along a securing arm, and reciprocating impact means for upsetting the ends of said spoke, said upsetting means mounted on a flexible suspension member.

3. In a wheel making apparatus, the combination of a spindle for rotatably securing the hub of such wheel, with a spider mounted coaxially therewith and adapted to secure the rim and hub of said wheel in proper relation to each other, a base plate movably mounted on a supporting arm, complementary spoke and rim receiving flanges adapted for axial displacement along said supporting arm, reciprocating impact means for upsetting the ends of said spokes, and a flexible supporting member adapted to hold said upsetting means in proper relation to the wheel.

4. In a wheel making apparatus, the combination of a spindle secured to a base plate and adapted to rotatably secure the hub of the wheel, with a spider mounted coaxially therewith and adapted to removably secure the hub and rim of said wheel in proper relation to each other, spoke gripping arms, fluid-operated means for actuating said spoke gripping arms, a reciprocating impact means for upsetting the ends of said spokes, and a bracket arm for holding said upsetting means.

5. In a wheel making apparatus, the combination of a spindle secured to a bed plate and adapted to rotatably secure the hub of the wheel, with a spider mounted coaxially therewith and adapted to removably secure the hub and rim of said wheel, spoke gripping arms, fluid-operated means for actuating said gripping arms and a reciprocating impact means for upsetting the ends of said spokes.

6. In a wheel making apparatus, the combination of a spindle adapted to rotatably secure the hub of the wheel, with a spider mounted coaxially therewith and adapted to removably secure the rim and hub of said wheel, spoke gripping arms, a piston for actuating said gripping arms, reciprocating impact means for upsetting the ends of said spokes, a bracket arm for supporting said upsetting means, and a plurality of electrical leads adapted to contact with portions of the spoke near its end and adapted to heat such spoke ends during the upsetting operation.

7. In a wheel making apparatus, the combination of a spoke and rim securing means, an electric lead connected to said securing means, a thrust bar adapted to upset the ends of the spoke, a guiding block for said thrust bar, an electric lead connected to said thrust bar, a toggle member adapted to actuate said thrust bar, and means for actuating said toggle member.

8. In a wheel making apparatus, the combination of a spoke and rim securing means, an electric lead connected to said securing means, a thrust bar adapted to upset the ends of the spoke, a guiding block for said thrust bar, an electric lead connected to said thrust bar, insulating means separating said guiding block from the body of the apparatus, a toggle member adapted to actuate said thrust bar, and means for actuating said toggle member.

9. In a wheel making apparatus, the combination of a base plate, a spindle projecting upwardly therefrom, a spider mounted on said base plate and rotatable about said spindle, and means movable axially of said spindle into engagement with the spokes of a wheel mounted on said spider.

10. In a wheel making apparatus, the combination of a base plate, a spindle projecting upwardly therefrom, a spider mounted on said base plate and rotatable about said spindle, means movable axially of said spindle into engagement with the spokes of a wheel mounted on said spider, and means for upsetting the ends of said spokes.

Signed by us this 16th day of March, 1931.

HARRY W. KRANZ.
CHARLES S. HOLDEN.
HAROLD R. UBER.